(12) United States Patent
Peak et al.

(10) Patent No.: US 8,263,532 B2
(45) Date of Patent: Sep. 11, 2012

(54) MICROARRAY SUBSTRATE, METHOD OF USE, AND PRODUCTS COMPRISING THE MICROARRAY SUBSTRATE

(75) Inventors: Sang-hyun Peak, Seoul (KR); Jong-myeon Park, Seoul (KR); Chang-eun Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 12/824,764

(22) Filed: Jun. 28, 2010

(65) Prior Publication Data

US 2010/0261621 A1    Oct. 14, 2010

Related U.S. Application Data

(62) Division of application No. 11/560,966, filed on Nov. 17, 2006, now abandoned.

(30) Foreign Application Priority Data

Jan. 3, 2006  (KR) .................. 10-2006-0000468

(51) Int. Cl.
  *C40B 60/06*   (2006.01)
  *C40B 30/04*   (2006.01)
  *C12Q 1/68*    (2006.01)
(52) U.S. Cl. .............. 506/39; 506/9; 506/16; 506/33; 435/6.1; 536/23.1
(58) Field of Classification Search .......... 435/6.1; 536/23.1
  See application file for complete search history.

(56) References Cited

U.S. PATENT DOCUMENTS

| | | |
|---|---|---|
| 5,143,854 A | 9/1992 | Pirrung et al. |
| 5,424,186 A | 6/1995 | Fodor et al. |
| 5,438,105 A * | 8/1995 | Nagata ................... 525/436 |
| 5,445,934 A | 8/1995 | Fodor et al. |
| 5,744,305 A | 4/1998 | Fodor et al. |

(Continued)

OTHER PUBLICATIONS

Reddy, A.V. Rami, Synthesis and characterization of poly(amide-imide)s and their precursors as materials for membranes, J. Applied Polymer Science, 2000, vol. 75; p. 1721-1727.

*Primary Examiner* — Christopher M Gross
*Assistant Examiner* — Jeremy C Flinders
(74) *Attorney, Agent, or Firm* — Cantor Colburn LLP

(57) ABSTRACT

Provided are a microarray substrate comprising a solid substrate coated with a chemical having a functional residue represented by Formula 1 or 2 below, a method of analyzing a biomolecule using the microarray substrate, and a lab-on-a-chip comprising the microarray substrate:

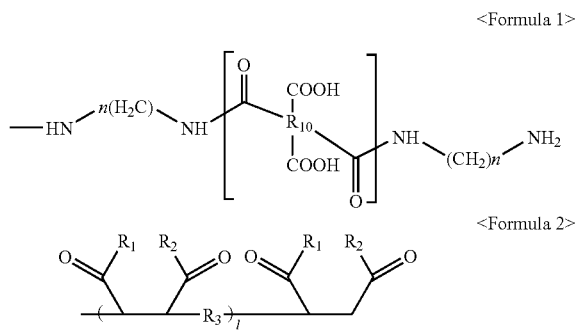

wherein n, the structure within brackets [ ], $R_1$, $R_2$, $R_3$, $R_{10}$, n and l are as defined in the specification.

5 Claims, 6 Drawing Sheets

U.S. PATENT DOCUMENTS

| | | |
|---|---|---|
| 6,207,369 B1 | 3/2001 | Wohlstadter et al. |
| 6,310,199 B1 | 10/2001 | Smith et al. |
| 7,402,390 B2 * | 7/2008 | Hwang et al. ............... 435/6.12 |
| 2001/0018513 A1 | 8/2001 | Baker |
| 2003/0096289 A1 * | 5/2003 | Suzuki et al. ............... 435/6 |
| 2003/0186296 A1 * | 10/2003 | Fodor et al. ............... 435/6 |

* cited by examiner

FIG. 4
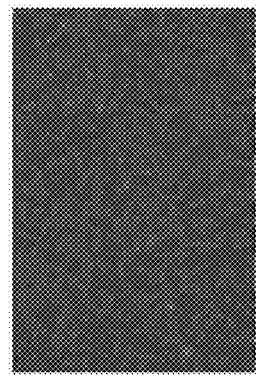
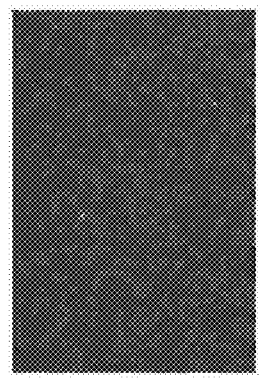
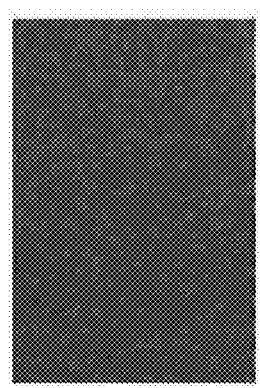

FIG. 5A
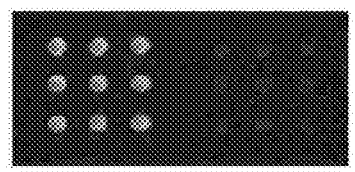
CONTROL MICROARRAY (PMT560)
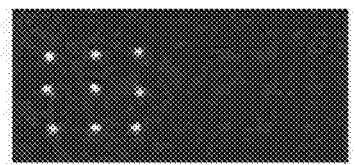
CRS 2 (PMT560)
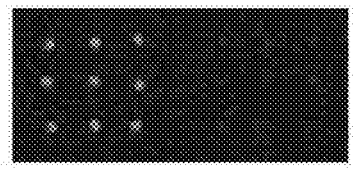
CRS 2 (PMT500)
FIG. 5B
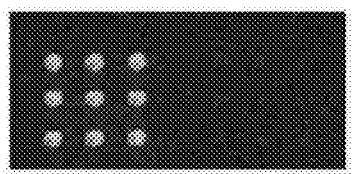
CONTROL MICROARRAY (PMT560)
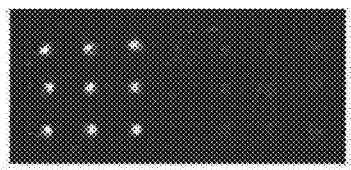
CRS 2 (PMT560)
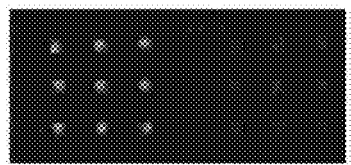
CRS 2 (PMT500)

SEQUENCE LISTING

```
<160> NUMBER OF SEQ ID NOS: 5

<210> SEQ ID NO 1
<211> LENGTH: 15
<212> TYPE: DNA
<213> ORGANISM: Artificial Sequence
<220> FEATURE:
<223> OTHER INFORMATION: probe DNA

<400> SEQUENCE: 1
```

```
tgttctcttg tcttg                                           15

<210> SEQ ID NO 2
<211> LENGTH: 15
<212> TYPE: DNA
<213> ORGANISM: Artificial Sequence
<220> FEATURE:
<223> OTHER INFORMATION: target DNA

<400> SEQUENCE: 2
caagacaaga gaaca                                           15

<210> SEQ ID NO 3
<211> LENGTH: 25
<212> TYPE: DNA
<213> ORGANISM: Artificial Sequence
<220> FEATURE:
<223> OTHER INFORMATION: probe DNA

<400> SEQUENCE: 3
aacatatgtg taagtaactg tgcac                                25

<210> SEQ ID NO 4
<211> LENGTH: 20
<212> TYPE: DNA
<213> ORGANISM: Artificial Sequence
<220> FEATURE:
<223> OTHER INFORMATION: primer

<400> SEQUENCE: 4
yccakactcc tacgggaggc                                      20

<210> SEQ ID NO 5
<211> LENGTH: 22
<212> TYPE: DNA
<213> ORGANISM: Artificial Sequence
<220> FEATURE:
<223> OTHER INFORMATION: primer

<400> SEQUENCE: 5
gtgccagcag yygcggtaat ac                                   22
```

MICROARRAY SUBSTRATE, METHOD OF USE, AND PRODUCTS COMPRISING THE MICROARRAY SUBSTRATE

CROSS-REFERENCE TO RELATED PATENT APPLICATIONS

This application is a division of U.S. patent application Ser. No. 11/560,966, filed Nov. 17, 2006, which claims priority to Korean Patent Application No. 10-2006-000468, filed Jan. 3, 2006, the disclosure of each of which is incorporated by reference herein in its entirety.

BACKGROUND

1. Field of the Invention

The present invention relates to a microarray substrate, a method of use, and products, e.g., a microarray and Lab-On-a-Chip (LOC) system, comprising the microarray substrate.

2. Description of the Related Art

A microarray refers to a high-density array of molecules immobilized in predetermined regions of a substrate. One way in which a microarray can be classified is based on the molecule immobilized on the substrate, e.g, a polynucleotide microarray, a protein microarray, etc. The term "polynucleotide microarray" refers to a high-density array of polynucleotides immobilized in predetermined regions of a substrate. Such microarrays are well known in the art. Examples of such microarrays are disclosed in U.S. Pat. Nos. 5,445,934 and No. 5,744,305.

Immobilization of polynucleotides on a solid substrate can be achieved by direct synthesis of polynucleotides on the solid substrate or by deposition of polynucleotides on predetermined regions of the solid substrate (spotting method). Illustrative methods for manufacturing such polynucleotide microarrays are disclosed in U.S. Pat. Nos. 5,744,305, 5,143,854, and No. 5,424,186.

The spotting method has been widely used for covalent attachment of biomolecules on solid substrates. For example, one widely used method of immobilizing biomolecules on a solid substrate includes: activating a surface of the solid substrate by introducing a nucleophilic functional group (e.g., an amino group) on the solid substrate, coupling biomolecules (e.g., polynucleotides) activated with a good leaving group to the surface-activated solid substrate, and removing any unreacted reactants. Drawbacks of this method include low attachment efficiency of polynucleotides to the coated surface and non-specific binding of target molecules to the coated surface or binding of impurities in the target sample to the coated surface.

Meanwhile, pH-dependent ion-exchange materials have been used in the separation of nucleic acids. For example, U.S. Patent Publication No. 2001/0018513 discloses a method of isolating a nucleic acid using a material having an ionizable group. The material is positively charged at a first pH to permit nucleic acid binding to the material; the bound nucleic acid is released from the material at a second pH higher than the first pH. Examples of such a material having an ionizable group include N-2-acetamido-2-aminoethanesulfonic acid (ACES), N-2-acetamido-2-imidodiacetic acid (ADA), N-trihydroxymethyl-methyl-2-aminoethanesulfonic acid (TES), and trihydroxymethylaminoethane. Additionally, U.S. Pat. No. 6,310,199 discloses a method of isolating a nucleic acid using a pH-dependent ion-exchange material including a silica magnetic particle and a plurality of ion-exchange ligands. Each ion exchange ligand comprises an aromatic hydrocarbon ring; a spacer covalently attached to the aromatic hydrocarbon ring; and a linker including a linker alkyl chain attached to the silica magnetic particle at a first end of the linker alkyl chain and attached to the spacer at a second end of the linker alkyl chain.

The present inventors have studied coating materials applicable to the solid substrate of a microarray substrate and have discovered that coating a microarray substrate with a pH-dependent ion-exchange material helps to solve the aforementioned problems of the prior art.

SUMMARY OF THE INVENTION

In one aspect, the invention provides a microarray substrate that enhances the immobilization efficiency of a probe biomolecule and reduces non-specific binding of impurities, such as proteins, and of target biomolecules, and furthermore, can simultaneously perform cell lysis, PCR, and probe-target hybridization.

In an embodiment, the microarray substrate comprises a solid substrate coated with a composition comprising a functional residue represented by Formula 1 or 2 below:

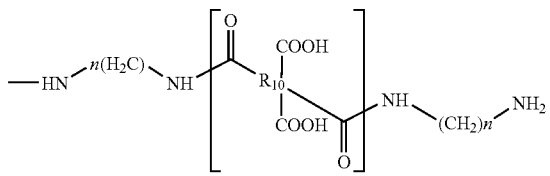

<Formula 1> wherein, n is an integer of 1 to 10;

the structure within brackets [ ] represents a moiety formed by reaction of a tetracarboxylic acid anhydride with an amine to produce —NH(CH$_2$)$_n$NH$_2$ and with an amino group to produce —NH(CH$_2$)$_n$NH— at opposite sides of the tetracarboxylic acid anhydride, wherein the tetracarboxylic acid anhydride is selected from the group consisting of pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 1,2,4,5-benzenetetracarboxylic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, bis(3,4-dicarboxyphenyl)ether dianhydride, bis(3,4-dicarboxyphenyl)sulfone dianhydride, 1,4,5,8-naphthalenetetracarboxylic dianhydride, 1,2,5,6-naphthalenetetracarboxylic dianhydride, 2,3,6,7-naphthalenetetracarboxylic dianhydride, 2,2-bis(3,4-dicarboxyphenyl)-hexafluoropropane dianhydride, cyclobutanetetracarboxylic dianhydride, methylcyclobutanetetracarboxylic dianhydride, and 1,2,3,4-tetracarboxybutane dianhydride; and R$_{10}$ is determined by the selected tetracarboxylic acid anhydride, and

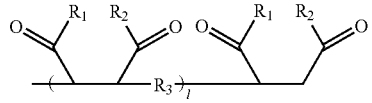

<Formula 2> wherein,
$R_1$ is —OH or —NH(CH$_2$)$_n$NH$_2$;
$R_2$ is —OH or —NH(CH$_2$)$_n$NH$_2$;
$R_3$ is $C_{1-10}$ alkyl; and
l is an integer of 1 to 30,000.

Also disclosed herein is a method of analyzing a biomolecule, comprising: obtaining a target biomolecule; and hybridizing a probe biomolecule, immobilized on the microarray substrate coated with a composition comprising a functional residue represented by Formula 1 or 2 at a first pH; and the target biomolecule at the second pH:

Also disclosed is a microarray comprising the microarray substrate and a Lab-on-a-Chip (LOC) comprising the microarray substrate.

BRIEF DESCRIPTION OF THE DRAWINGS

FIGS. 3 and 4 are fluorescence intensity data obtained after target DNAs hybridized with probe DNAs immobilized on a control microarray and test microarrays (CRS1 and 2) according to the present invention;

FIG. 5A shows fluorescence images obtained after target DNAs are hybridized with probe DNAs immobilized on a control microarray and a test microarray (CRS 2) according to the present invention that have been immersed in a pH 3 solution, and FIG. 5B show fluorescence images obtained after target DNAs are hybridized with probe DNAs immobilized on a control microarray and a test microarray (CRS 2) according to the present invention that have not been immersed in a pH 3 solution.

DETAILED DESCRIPTION OF THE INVENTION

Figure 1:
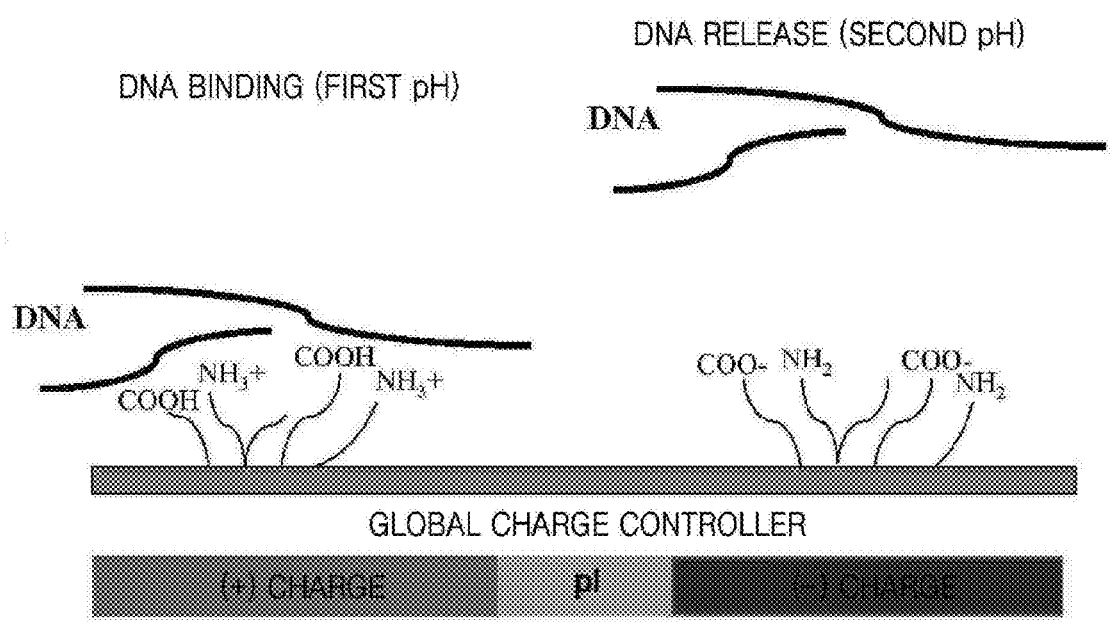
FIG. 1 is a schematic drawing of DNA binding to or releasing from a microarray substrate according to the present invention with respect to pH change.
Figure 2:
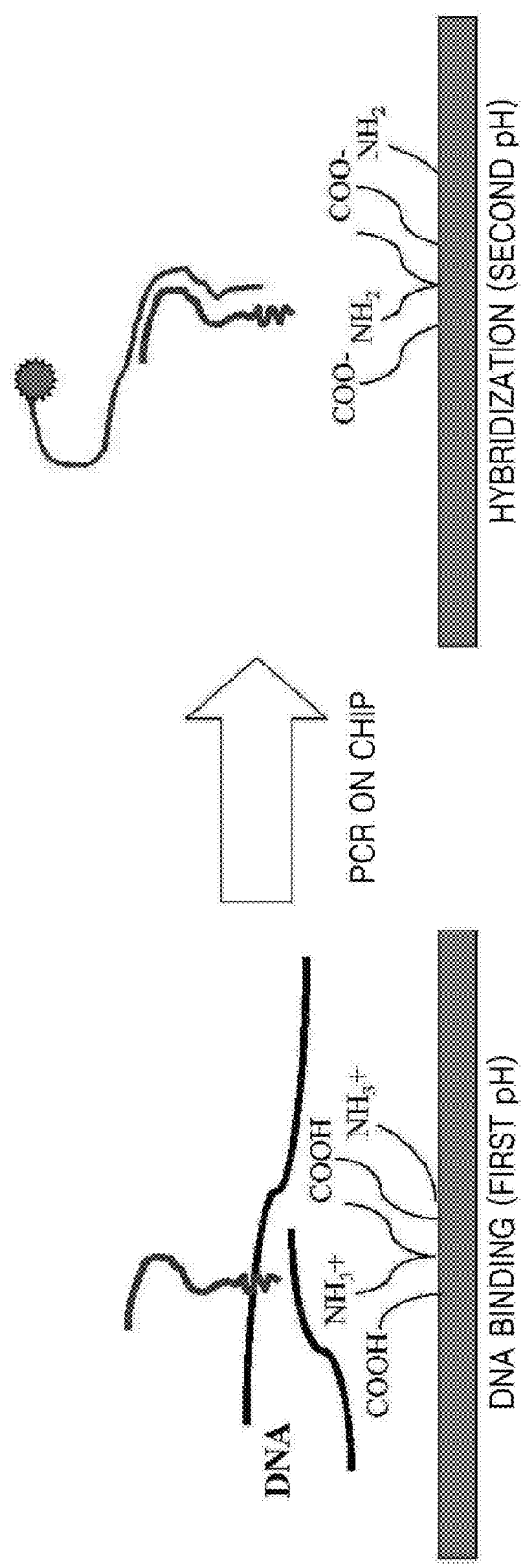
FIG. 2 is a schematic drawing of a binding interaction between a probe DNA and a target DNA on a substrate before and after PCR on a chip.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In one embodiment, the invention provides a microarray substrate comprising a solid substrate coated with a composition comprising a functional residue represented by Formula 1:

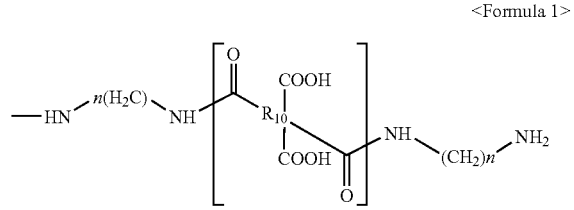

<Formula 1> wherein,
n is an integer of 1 to 10;
the structure within brackets [ ] represents a moiety formed by reaction of a tetracarboxylic acid anhydride with an amine to produce —NH(CH$_2$)$_n$NH$_2$ and with an amino group to produce —NH(CH$_2$)$_n$NH— at opposite sides of the tetracarboxylic acid anhydride; wherein the tetracarboxylic acid is selected from the group consisting of pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 1,2,4,5-benzenetetracarboxylic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, bis(3,4-dicarboxyphenyl)ether dianhydride, bis(3,4-dicarboxyphenyl)sulfone dianhydride, 1,4,5,8-naphthalenetetracarboxylic dianhydride, 1,2,5,6-naphthalenetetracarboxylic dianhydride, 2,3,6,7-naphthalenetetracarboxylic dianhydride, 2,2-bis(3,4-dicarboxyphenyl)-hexafluoropropane dianhydride, cyclobutanetetracarboxylic dianhydride, methylcyclobutanetetracarboxylic dianhydride, and 1,2,3,4-tetracarboxybutane dianhydride; and $R_{10}$ is determined by the selected tetracarboxylic acid anhydride.

In an embodiment, the invention provides a microarray substrate comprising a solid substrate coated with a composition comprising a functional residue represented by Formula 2:

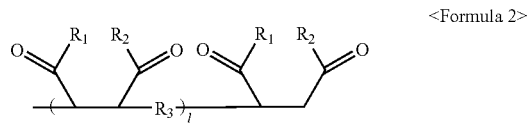

<Formula 2> wherein,
$R_1$ is —OH or —NH(CH$_2$)$_n$NH$_2$; $R_2$ is —OH or —NH(CH$_2$)$_n$NH$_2$; n is an integer of 1 to 10; $R_3$ is $C_{1-10}$ alkyl; and l is an integer of 1 to 30,000.

In the microarray substrate, the functional residues of Formulae 1 and 2 are amino- and carboxyl-containing materials, i.e., bifunctional materials that are positively charged at a first pH and negatively charged at a second pH.

The value of the first pH can be lower than the pKa value of the carboxyl groups of the functional residues of Formulae 1 and 2. Specifically, the first pH can be about 2 to about 3.5 but the present invention is not limited thereto. The value of the second pH is not limited to a particular range provided that it is higher than the value of the first pH. Specifically, the second pH can be about 5 to about 10.

The solid substrate can be a plastic substrate made of polyethylene, polypropylene, polystyrene, or polyurethane; a glass substrate; a silicon wafer; or a modified substrate thereof, but the present invention is not limited to the illustrated examples.

The microarray substrate coated with a composition comprising the functional residue of Formula 1 and the microarray substrate coated with a composition comprising the functional residue of Formula 2 have similar effects in terms of increasing the immobilization efficiency of a probe biomolecule, reducing non-specific binding of a target biomolecule, or the non-specific binding of impurities, for example, proteins, that may be contained in the target sample, and furthermore, can simultaneously perform cell lysis, PCR, and probe-target hybridization.

In the microarray substrate of the present invention, the functional residue of Formula 1 can be a functional residue represented by Formula 3 below and the functional residue of Formula 2 can be a functional residue represented by Formula 4 below:

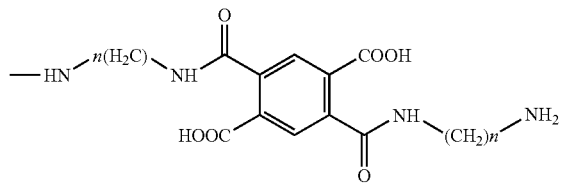
<Formula 3> wherein,
n is an integer of 1 to 10, and

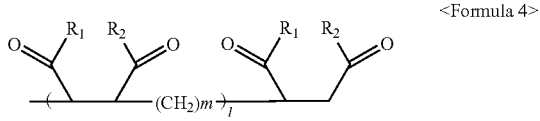
<Formula 4> wherein,
$R_1$ can be —OH or —NH(CH$_2$)$_n$NH$_2$; and $R_1$ can be —OH or —NH(CH$_2$)$_n$NH$_2$; where n is an integer of 1 to 10; m is an integer of 1 to 10; and l is an integer of 1 to 30,0000.

Each of the functional residues of Formulae 1 and 2 comprises an amino group and a carboxyl group.

For the functional residue of Formula 1, a ratio of positive charge to negative charge at the first pH can be about 2 to 1. A positive charge of plus 1 (+1) is preferred. More specifically, the functional residue of Formula 1 can be the functional residue of Formula 3 where n is 2.

For the functional residue of Formula 2, the ratio of the —OH group to the —NH(CH$_2$)$_n$NH$_2$ group represented by $R_1$ and/or $R_2$ can be about 2 to 1. More specifically, the functional residue of Formula 2 can be the functional residue of Formula 4 where m is 2 and l is an integer of 1 to 30,000.

The preparation of the microarray substrate can be performed using any method known in the art. For example, the microarray substrate coated with a composition comprising the functional residue of Formula 1 can be prepared by immobilizing a tetracarboxylic acid anhydride, for example 1,2,4,5-benzenetetracarboxylic anhydride, on a solid substrate (e.g., a silicon wafer, a glass substrate, or a plastic substrate) coated with an amino group (e.g., —NH$_2$(CH$_2$)$_n$NH$_2$) followed by reaction with a compound (e.g., ethylenediamine) represented by NH$_2$(CH$_2$)$_n$NH$_2$ where n is an integer of 1 to 10. The microarray substrate coated with a composition comprising the functional residue of Formula 2 can be prepared by immobilizing a compound, for example the compound represented by Formula 5 below, on an amino group-coated substrate followed by reaction with a compound (e.g., ethylenediamine) represented by NH$_2$(CH$_2$)$_n$NH$_2$ where n is an integer of 1 to 10:

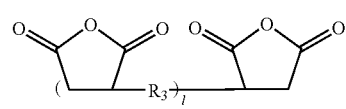
<Formula 5> wherein,
$R_3$ is $C_{1-10}$ alkyl; and
l is an integer of 1 to 30,000.

The compound of Formula 5 can be a compound represented by Formula 6 below:

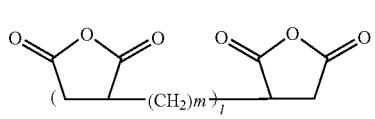
<Formula 6> wherein,
m is an integer of 1 to 10; and
l is an integer of 1 to 30,000.

The compound of Formula 5 is a polyanhydride polymer. The polyanhydride polymer can be easily separated from a solution using a separation method (e.g., centrifugation).

The present invention also provides a method of analyzing a biomolecule using the microarray substrate. The method comprises obtaining a target biomolecule; and hybridizing a probe biomolecule, immobilized on the microarray substrate coated with a composition comprising a functional residue represented by Formula 1 or 2 at a first pH; and the target biomolecule at a second pH.

A probe biomolecule is immobilized on the microarray substrate at a first pH to prepare a microarray. The probe biomolecule can be, but is not limited to, a nucleic acid. When a probe biomolecule is a nucleic acid, the first pH may be lower than the pKa values of the carboxyl groups of the functional residues of Formulae 1 or 2. Specifically, the first pH may be about 2 to about 3.5. However, the first pH is not limited thereto.

Common problems associated with the prior art are non-specific binding of target biomolecules, e.g. nucleic acid, to a microarray substrate and non-specific binding of impurities, e.g. proteins that may be contained in a target sample. Therefore, it has been common to treat the microarray substrate with chemicals after immobilization of a probe nucleic acid to reduce the aforementioned non-specific binding. For example, in order to block non-specific binding of a target DNA with an unreacted amino group on a substrate, the substrate may be treated with anhydrous succinic acid after immobilization of a probe DNA on the substrate.

For the microarray substrate according to the invention, however, the above mentioned non-specific binding can be significantly reduced without any post-immobilization treatment. Further, non-specific binding of impurities such as proteins is also reduced using the disclosed microarray substrate.

Target molecules can be obtained according to various methods known to those skilled in the art. When the target molecule is a nucleic acid, preparation methods include, but are not limited to, organic extraction and precipitation, PCR amplification, ion-exchange chromatography, reversed phase chromatography, affinity chromatography and a combination of the above methods.

After immobilizing the probe biomolecule, a target biomolecule can be attached to a probe-free region of the microarray substrate at the first pH. Since the functional residue of Formula 1 or 2 immobilized on the microarray substrate can bind with the target biomolecule, like the probe biomolecule, at the first pH, the target biomolecule can be attached to the probe-free region of the microarray substrate, permitting processes such as cell lysis and purification of a target biomolecule to be performed on the microarray substrate.

For example, if using a nucleic acid from a cell as the target biomolecule, a sample containing such cells is applied to a probe-free region of the microarray substrate. Then, the cells are lysed at the first pH, and the target biomolecule released from the lysed cells is attached to a probe-free region of a microarray substrate via the functional residue of Formula 1 or 2. After attaching the target biomolecule to the microarray substrate, the microarray substrate may be washed to remove components of the cell lysate other than the bound target biomolecule.

The purified target biomolecule is then eluted from the microarray substrate at a second pH and amplified. When the target molecule is a nucleic acid, a crude PCR product can be directly used as a target nucleic acid sample with no purification after PCR amplification since non-specific binding of proteins on the microarray substrate is significantly reduced at a second pH. Therefore, the use of the microarray substrate of the present invention enables simultaneous execution of cell lysis, PCR, and probe-target hybridization.

After amplifying the target biomolecule, the probe biomolecule immobilized on the microarray is hybridized with the target biomolecules at a second pH.

The value of the second pH is not limited to a particular range provided that it is higher than the value of the first pH. Specifically, the second pH may be about 5 to about 10. A probe-target hybrid can be washed with a washing buffer (e.g. SSPET, SSC buffer).

After performing hybridization between the probe biomolecule and the target biomolecule, the target biomolecule is analyzed, for example by using fluorescence intensity, etc.

In another aspect, the invention provides a microarray comprising the microarray substrate with a probe biomolecule immobilized thereon and a Lab-On-a-Chip (LOC) comprising the microarray substrate.

Hereinafter, the present invention will be described more specifically with reference to the following working examples, which are not intended to limit the scope of the invention.

EXAMPLES

Example 1

Preparation of Microarray Substrates According to the Present Invention (1) Manufacturing of Microarray Substrates According to the Present Invention
Microarray substrates coated with a composition comprising a functional residue of Formula 3 where n was 2 were manufactured.

Gamma-aminopropyltriethoxysilane (GAPS)-coated silicon wafers (LG Siltron, Korea) were immersed in a solution of 100 mM 1,2,4,5-benzenetetracarboxylic anhydride in N-methyl-2-pyrrolidone (NMP) for one hour, washed with acetone, and dried in vacuum. The resultant 1,2,4,5-benzenetetracarboxylic anhydride-covalently bound silicon wafers were immersed in a solution of 100 mM ethylenediamine in NMP for one hour, washed with ethanol, and dried. The resulting microarray substrates according to the present invention are hereinafter, designated as "test substrates".

(2) Preparation of Control Substrates
In the following working examples, GAPS-coated silicon wafers were used as control substrates.

Example 2

Manufacturing of Polynucleotide Microarrays (1) Manufacturing of Polynucleotide Microarrays (Including Post-Treatment after Probe Immobilization)
Polynucleotide microarrays in which 5'-end functionalized DNAs were arranged in two or more groups of spots on the test substrates prepared in (1) of Example 1 were manufactured as follows.

A spotting solution was prepared. The composition of the spotting solution was as follows: 50% formamide, 25% a solution of polyethyleneglycol (PEG) (MW: 10,000) in phosphate buffer (100 mM, pH 3), and 25% a solution containing a probe DNA (SEQ ID NO: 1) having an amino ($NH_2$) group at the 5'-end. The final concentration of DNA in the spotting solution was 20 μM.

The spotting solution thus prepared was spotted on the test substrates using a Pix5500 spotter (Cartesian) (500 pl per spot). The test substrates having the spots were incubated in a constant temperature and humidity chamber (70° C., 40% humidity) for one hour so that the probe DNAs were immobilized on the test substrates. After the reaction was terminated, the test substrates were washed with distilled water, treated with anhydrous succinic acid (blocking agent) to block unreacted amino groups, washed with ethanol, and spin-dried to obtain polynucleotide microarrays with immobilized probe DNAs (hereinafter, designated as "CRS1 microarrays"). Each spot group of each CRS1 microarray consisted of nine spots. The spacing between the spots was 300 μm.

Meanwhile, "control microarrays" were manufactured in the same manner as described above using the GAPS-coated silicon wafers prepared in (2) of Example 1.

(2) Manufacturing of Polynucleotide Microarrays (Excluding Post-Treatment after Probe Immobilization)
Polynucleotide microarrays according to the present invention (hereinafter, designated as "CRS 2 microarrays") were manufactured in the same manner as in (1) using the test substrates of the invention prepared in (1) of Example 1 except that no post-treatment after probe immobilization was performed (i.e., without the steps of treating the test substrates with immobilized probe DNAs with anhydrous succinic acid and the subsequent washes).

Example 3

Evaluation of Immobilization Efficiency of Probe Polynucleotides

Hybridization of the probe DNAs immobilized on the polynucleotide microarrays manufactured in Example 2 with target DNAs was performed and the hybridization results were detected to thereby determine the immobilization efficiency of the probe DNAs on the polynucleotide microarrays.

Oligonucleotides (SEQ ID NO: 2) having —$NH_2$-Cy3 at the 5'-end were used as target DNAs. A volume of 15 μl of the target DNAs (100 pM) was placed in a 1.5 ml tube, vortexed for 10 seconds, and centrifuged.

The target DNAs were denatured in a 94° C. heating block for 5 minutes and placed on ice. In this state, 16 μl of a hybridization buffer (a diluted solution of $NaH_2PO_4H_2O$ 138 g, NaCl 876 g, 0.5M EDTA 200 ml, and 10N NaOH 100 ml) was added to the target DNAs to reach a total volume of 31 µl. The hybridization solution was vortexed for 10 seconds, centrifuged for 10 seconds, and applied to the CRS 1 and CRS 2 microarrays of the invention and to the control microarrays. The CRS 1 and CRS 2 microarrays and the control microarrays were incubated at 42° C. for one hour, washed with washing solution I (3×SSPET) and washing solution II (1×SSPET) for 5 minutes (for each), and dried. Fluorescence images were acquired using a GenePix 4000B scanner (Axon Instruments) and analyzed using GenePix Pro software (Axon Instruments, Union City, Calif.). The fluorescence image data and the fluorescence intensity data are presented in Table 1 below and FIG. 3. The fluorescence intensity was observed at 532 nm (PMT560 or PMT500Z).

TABLE 1

| Section | Control microarray (PMT 560) | CRS 1 | | CRS 2 | |
|---|---|---|---|---|---|
| | | PMT560 | PMT500 | PMT560 | PMT500 |
| Intensity | 31345 | 65500 | 43100 | 65500 | 54290 |
| Background | 57 | 279 | 54 | 281 | 53 |

Figure 3:
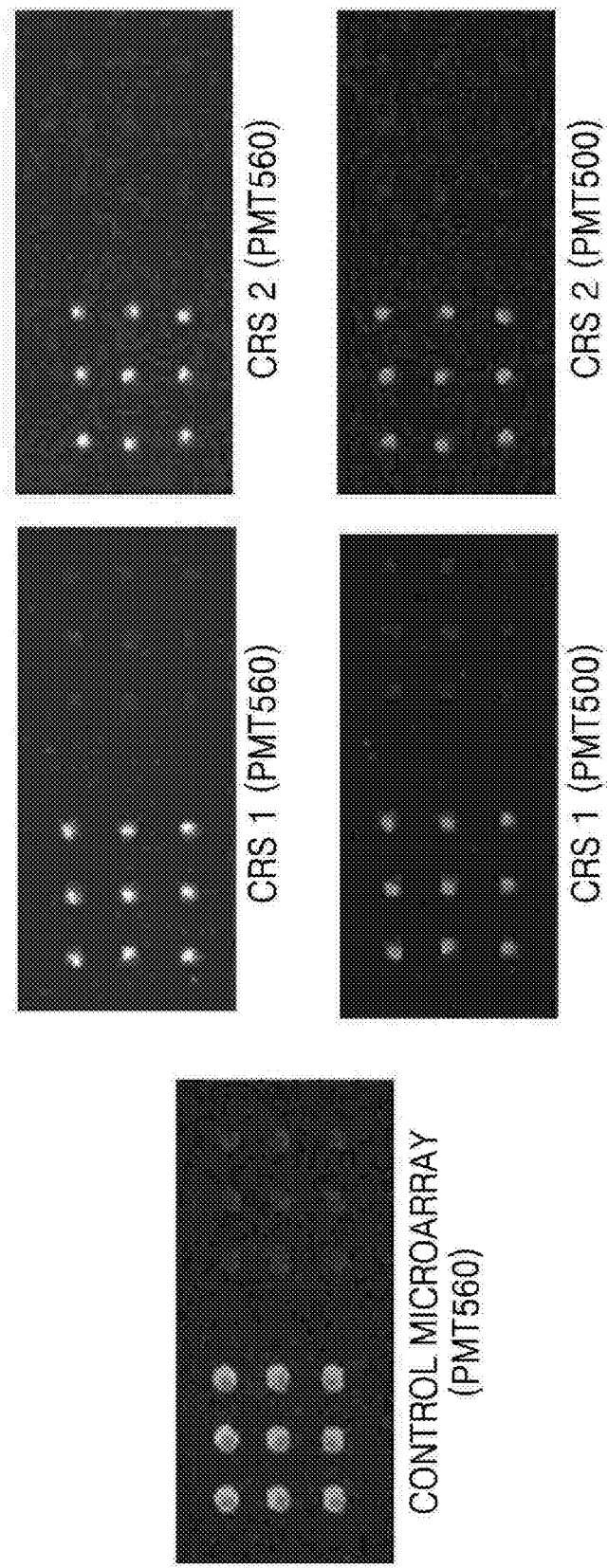

As shown in Table 1 and FIG. 3, the immobilization efficiency of the probe DNAs of the microarrays of the present invention were comparable with or without the post-treatment after probe immobilization. Both showed superior immobilization efficiency as compared to that of the control microarrays.

Example 4

Analysis of Non-specific Binding of Target DNAs on Microarray Substrates with or without Post-Treatment after Probe Immobilization As in Example 3, hybridization of the probe DNAs immobilized on the polynucleotide microarrays manufactured in Example 2 with target DNAs was performed, and background image data and fluorescence intensities of the microarrays were detected. Images were obtained using the same machine and data were analyzed using the same software. The background image data and fluorescence intensities are presented in Table 2 below and FIG. 4. The fluorescence intensities were obtained at 532 nm (PMT560).

TABLE 2

| | Control microarray | | | CRS1 | | | CRS2 | | |
|---|---|---|---|---|---|---|---|---|---|
| | 1 | 2 | Average | 1 | 2 | Average | 1 | 2 | Average |
| Intensity | 230 | 241 | 235 | 254 | 274 | 264 | 266 | 301 | 283 |

As shown in Table 2 and FIG. 4, after probe-target hybridization, background fluorescence intensities obtained from the CRS 2 microarrays of the invention (excluding post-treatment after probe immobilization) were comparable to those from the CRS 1 microarrays of the invention (including post-treatment after probe immobilization). These results show that the use of a microarray substrate of the present invention reduces non-specific binding of a target DNA under probe-target hybridization conditions.

Example 5

Determination of Damage to Probes at pH 3

Damage to a probe DNA immobilized on a substrate in a pH 3 environment was investigated by measuring the degree of hybridization between the probe DNA and a target DNA.

(1) The CRS 2 microarrays of the invention and the control microarrays prepared in Example 2 were immersed in a pH 3 binding buffer (100 mM phosphate buffer) for 5 minutes. Then, target DNAs (500 pM, oligonucleotides (SEQ ID NO: 2) having —$NH_2$-Cy3 at the 5'-end) as described in Example 3 and a hybridization buffer (6×SSPE-0.1% Triton X-100) were mixed in equal volume. The reaction solution was applied to the CRS 2 microarrays and the control microarrays. The CRS 2 microarrays and the control microarrays were incubated at 42° C. for one hour, washed with washing buffer I (3×SSPE-Triton X-100 0.005%) for 5 minutes and then with washing buffer II (1×SSPE-Triton X-100 0.005%) for 5 minutes, and then dried at room temperature for 15 minutes. Fluorescence images were acquired at 532 nm (PMT 560) using a GenePix 4000B scanner (Axon Instruments) and analyzed using GenePix Pro software (Axon Instruments, Union City, Calif.). The results are presented in Table 3 below (see FIG. 5A).

(2) As a control, hybridizations and post hybridization washes were carried out under the same conditions for CRS2 and control microarrays as in (1), except without immersing those arrays in the pH3 solution. Fluorescence images were obtained and analyzed using the same machine and software. The results are presented in Table 3 and FIG. 5B.

TABLE 3

| | Immersion in pH 3 buffer | | No immersion in pH 3 buffer | |
|---|---|---|---|---|
| Microarray | Intensity | Background | Intensity | Background |
| Control microarray (PMT 560) | 31345 | 60 | 42653 | 57 |
| CRS 2 (PMT 560) | 65500 | 281 | 65500 | 279 |
| CRS 2 (PMT 500) | 53107 | 53 | 54290 | 54 |

As shown in Table 3 and FIGS. 5A and 5B, the degree of probe-target hybridization for the CRS 2 microarrays of the invention exposed to the pH 3 environment was similar to that of the CRS 2 microarrays of the invention unexposed to pH3 environment. These results show that a probe immobilized on a microarray of the present invention is not damaged under an acidic condition such as pH 3.

Example 6

Determination of PCR Efficiency

CRS beads were prepared in the same manner as described in (1) of Example 1 except that silica beads were used instead of the silicon wafers.

Probe DNAs consisting of a nucleotide sequence of SEQ ID NO: 3 were immobilized on the CRS beads in the same manner as described in Example 2. No post-treatment was performed after probe immobilization.

Hybridization between target DNAs (genomic DNAs (gDNAs) derived from *Staphylococcus aureus*) and the probe DNAs immobilized on the CRS beads was performed. Bound target DNAs were eluted from the CRS beads by incubating the beads in a PCR buffer at 95° C. for one minute. Then, PCR was performed using the eluted solution and the PCR efficiency (DNA yield) was measured.

As a negative control, hybridization between the target DNAs and the probe DNAs immobilized on the CRS beads was performed, and the target DNAs were eluted from the CRS beads by incubating the beads in a PCR buffer at room temperature for one minute. Then, PCR was performed using the eluted solution and the PCR efficiency was measured.

As a positive control, a conventional solution-phase PCR was performed and the PCR efficiency was measured.

The PCR was performed for 25 cycles using a PCR GENE-AMP® thermocycler (Applied Biosystems). The composition of the PCR solution was as follows: 10µl 10× PCR buffer (Solgent), 5 µl of the eluted solution (template), 0.68 µM primers (forward primers: oligonucleotides consisting of SEQ ID NO: 4, reverse primers: oligonucleotides consisting of SEQ ID NO: 5), 0.25 mM dNTPs, and 0.5 unit Taq polymerase (total volume: 50 µl).

The PCR was performed according to the following program: denaturation of 95° C. for one minute, 25 cycles of 95° C. for 5 seconds, 62° C. for 13 seconds, and 72° C. for 15 seconds, and extension of 72° C. for one minute.

Figure 6:
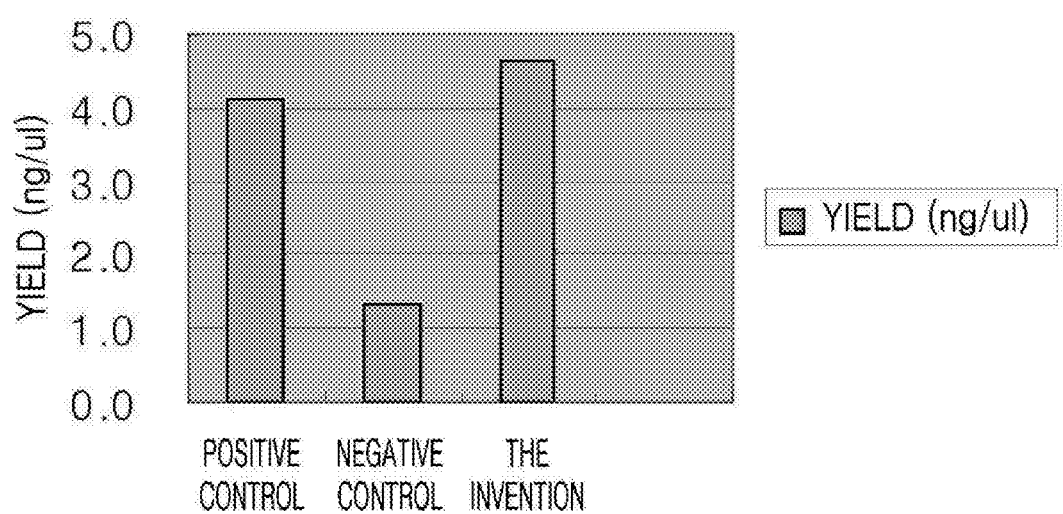
FIG. 6 shows PCR yields after solution-phase PCR (positive control) and after PCR using CRS beads according to the present invention.

After the PCR reaction, DNA yield was measured using a Lab chip (Agilent). The yields of the reactions were: positive control: 4.1 ng/ul, negative control: 1.4 ng/µl, and the invention: 4.7 ng/µl (see FIG. 6). The PCR yield of the invention was greater than that obtained by the positive control. These results show that cell lysis, nucleic acid purification, and PCR can be performed on a chip comprising a microarray substrate of the present invention.

As described above, microarray substrates of the invention provide several advantages: enhancing the immobilization efficiency of a probe biomolecule, and reducing non-specific binding of a target biomolecule or impurities such as proteins. Thus, after a probe biomolecule is immobilized on the microarray substrate, no further post-treatment of the microarray substrate is required Further, a crude sample from a PCR reaction can be directly applied to the microarray substrate, thereby ensuring process simplicity and cost-effectiveness in chip production and biomolecule assay.

The terminology used herein is for the purpose of describing particular embodiments only and is not intended to be limiting of the invention. The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to").

Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for analyzing a target nucleic acid, comprising: covalently immobilizing a probe nucleic acid to a microarray substrate at a first pH;

hybridizing a target nucleic acid to the immobilized probe nucleic acid at a second pH; and detecting hybridization, wherein the microarray substrate comprises a solid substrate having covalently immobilized thereon a functional residue represented by Formula 1:

<Formula 1>

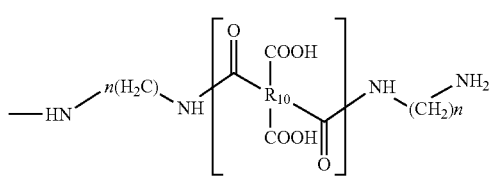

wherein, n is an integer of 1 to 10; and the structure within brackets [ ] represents a moiety formed by reaction of a tetracarboxylic acid anhydride with an amine to produce —NH(CH2)nNH2 and with an —NH(CH2)nNH2 amino group covalently bonded to the solid substrate to produce —NH(CH2)nNH— at opposite sides of the tetracarboxylic acid anhydride;

wherein the tetracarboxylic acid anhydride is selected from the group consisting of 3,3',4,4'-biphenyltetracarboxylic dianhydride, 2,2',3,3'-biphenyltetracarboxylic dianhydride, 2,3,3',4'-biphenyltetracarboxylic dianhydride, 1,2,4,5-benzenetetracarboxylic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, bis(3,4-dicarboxyphenyl)ether dianhydride, bis(3,4-dicarboxyphenyl)sulfone dianhydride, 1,4,5,8-naphthalenetetracarboxylic dianhydride, 1,2,5,6-naphthalenetetracarboxylic dianhydride, 2,3,6,7-naphthalenetetracarboxylic dianhydride, 2,2-bis(3,4-dicarboxyphenyl)-hexafluoropropane dianhydride, cyclobutanetetracarboxylic dianhydride, methylcyclobutanetetracarboxylic dianhydride, and 1,2,3,4-tetracarboxybutane dianhydride; and $R_{10}$ is determined by the selected tetracarboxylic acid anhydride.

2. The method of claim 1, wherein the functional residue is represented by Formula 3 below:

<Formula 3>

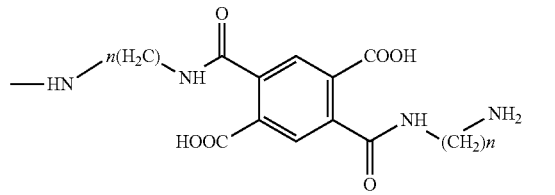

wherein n is an integer of 1 to 10.

3. The method of claim 2, wherein n is 2.

4. The method of claim 1, wherein the first pH is about 2 to about 3.5, the second pH is about 5 to about 10.

5. The method of claim 1, wherein the solid substrate is made of a material selected from a group consisting of silicon, glass, and a plastic material.

* * * * *